United States Patent [19]
Cox
[11] 3,896,395
[45] July 22, 1975

[54] LINEAR AMPLIFICATION USING QUANTIZED ENVELOPE COMPONENTS TO PHASE REVERSE MODULATE QUADRATURE REFERENCE SIGNALS

[75] Inventor: Donald Clyde Cox, New Shrewsbury, N.J.
[73] Assignee: Bell Telephone Laboratories, Incorporated, Murray Hill, N.J.

[22] Filed: July 18, 1974
[21] Appl. No.: 489,760

[52] U.S. Cl. .................. 330/53; 328/149; 328/156; 330/10; 330/124 R; 332/41
[51] Int. Cl.[2] .............................................. H03F 3/60
[58] Field of Search............. 330/53, 10; 328/156 C, 328/149 C

[56] References Cited

UNITED STATES PATENTS 3,426,292 2/1969 Seidel .............................. 330/53 X

*Primary Examiner*—Nathan Kaufman
*Attorney, Agent, or Firm*—David L. Hurewitz

[57] ABSTRACT

Available devices including quadrature detectors, delta coders and nonlinear amplifying devices are used to produce linear amplification of a bandpass analog input signal having amplitude variations. This linear amplification technique is primarily useful at high frequencies. The analog input signal is resolved into two variable amplitude quadrature components, the envelopes of which together contain the total information content of the input. The envelopes are applied to separate delta coders which each produce a delta bitstream whose weighted time average approximates the respective envelope. The constant amplitude delta bitstreams phase reverse (phase shift key) modulate two quadrature reference signals.

In one embodiment, nonlinear high level phase reverse modulators are used to produce two high level output signals, which are then summed and bandpass filtered to produce a linearly amplified replica of the original analog input signal. In another embodiment, two output signals from low level phase reverse modulators are each amplified by separate nonlinear amplifiers. The amplified resultants are then summed and bandpass filtered to produce a linearly amplified replica of the original analog input signal.

In all embodiments, a decoder feedback loop is required. This loop may be either internal to the delta coder or external and coupled to the linearly amplified replica.

10 Claims, 4 Drawing Figures

LINEAR AMPLIFICATION USING QUANTIZED ENVELOPE COMPONENTS TO PHASE REVERSE MODULATE QUADRATURE REFERENCE SIGNALS

BACKGROUND OF THE INVENTION

This invention relates to amplification circuits, and more particularly to circuits for providing linear bandpass amplification of high frequency, amplitude varying signals. This invention is an alternative to the technique disclosed in U.S. Pat. No. 3,777,275 issued on Dec. 4, 1973 to D. C. Cox.

In many communication applications a linear response of the transmitter power amplifier is required because the signal to be amplified contains amplitude variations and a nonlinear device would cause undesirable distortion. Hence, systems utilizing standard AM transmission and those using more complex amplitude varying signals, such as ones having single sideband modulation or frequency multiplexed sets of separately modulated low-level carriers, both of which contain a composite of amplitude and phase fluctuations, are severely limited by the availability of linear amplifying devices.

Unfortunately, solid-state linear power amplifiers are difficult to build for microwave and millimeter wave frequencies in the 6 to 100 GHz range, and at lower frequencies such as 1 to 6 GHz high power linear devices are often unavailable or very expensive.

Conversely, nonlinear solid-state power amplifiers are readily available at microwave frequencies such as 1 or 2 GHz, and constant amplitude phase lockable signal sources (GUNN and IMPATT diodes) are available in the 2 to 100 GHz microwave and millimeter wave range. For high power applications in the 0.1 to 10 GHz range, nonlinear electron tube amplifiers and power oscillators are substantially less costly than are linear devices.

It is an object of the present invention to provide linear amplification of amplitude varying analog signals at microwave and millimeter wave frequencies, especially above 1 GHz, by using only available state of the art circuit components including nonlinear amplifying devices. It is also an object of the present invention to utilize the same principles to provide linear amplification suitable for high power applications at lower frequencies.

SUMMARY OF THE INVENTION

In accordance with the present invention a LIST (linear amplification by sampling technique) amplifier is used to produce an amplified replica of an original bandpass analog input signal. The bandpass input signal, which may be mathematically represented as the sum of two quadrature signal components, is first resolved into the variable low-pass intelligence-containing envelopes of these two components by quadrature detectors. One variable envelope is applied as an input to one delta coder and the other envelope is applied as an input to another delta coder. Each delta coder generates from its input envelope a stream of bits whose weighted time average is an approximate replica of the corresponding input envelope. Each delta coder includes a comparator and an internal decoder feedback loop containing a low-pass filter having particular characteristics to reconstruct a replica of the analog envelope input to the delta coder. Two modulation reference signals which are of equal amplitude and in phase quadrature are generated. One delta coded bitstream phase reverse (phase shift key) modulates one of the modulation reference signals and the other delta coded bitstream phase reverse modulates the other modulation reference signal to form two constant envelope signals. In the frequency domain, the result of this phase reverse modulation is a frequency translation of the low-pass delta coded waveform spectrum from a region centered about dc to a region centered about a higher frequency of the modulation reference signals, arbitrarily chosen for the phase reverse modulation process.

The phase reverse modulation may be either low level modulation such as balanced mixer modulation used in conjunction with signal amplification or, alternatively, it may be high level modulation such as path length modulation which provides both modulation and signal amplification. These two alternative embodiments of the invention permit two possible hardware implementations for a phase reverse modulator.

The two signals resulting from either the high level modulation or low level modulation and amplification are then summed and bandpass filtered. The bandpass filter has characteristics which are the bandpass equivalent of the low-pass characteristics of the previously mentioned low-pass filter in the decoder feedback loop of the delta coder. Accordingly, the bandpass filter produces an amplified replica of the original input signal to the quadrature detectors.

In other embodiments of the invention, an external decoder feedback loop coupled from the LIST amplifier output to the comparator inputs is used instead of an internal decoder order feedback loop in the delta coder.

DETAILED DESCRIPTION

Figure 1:
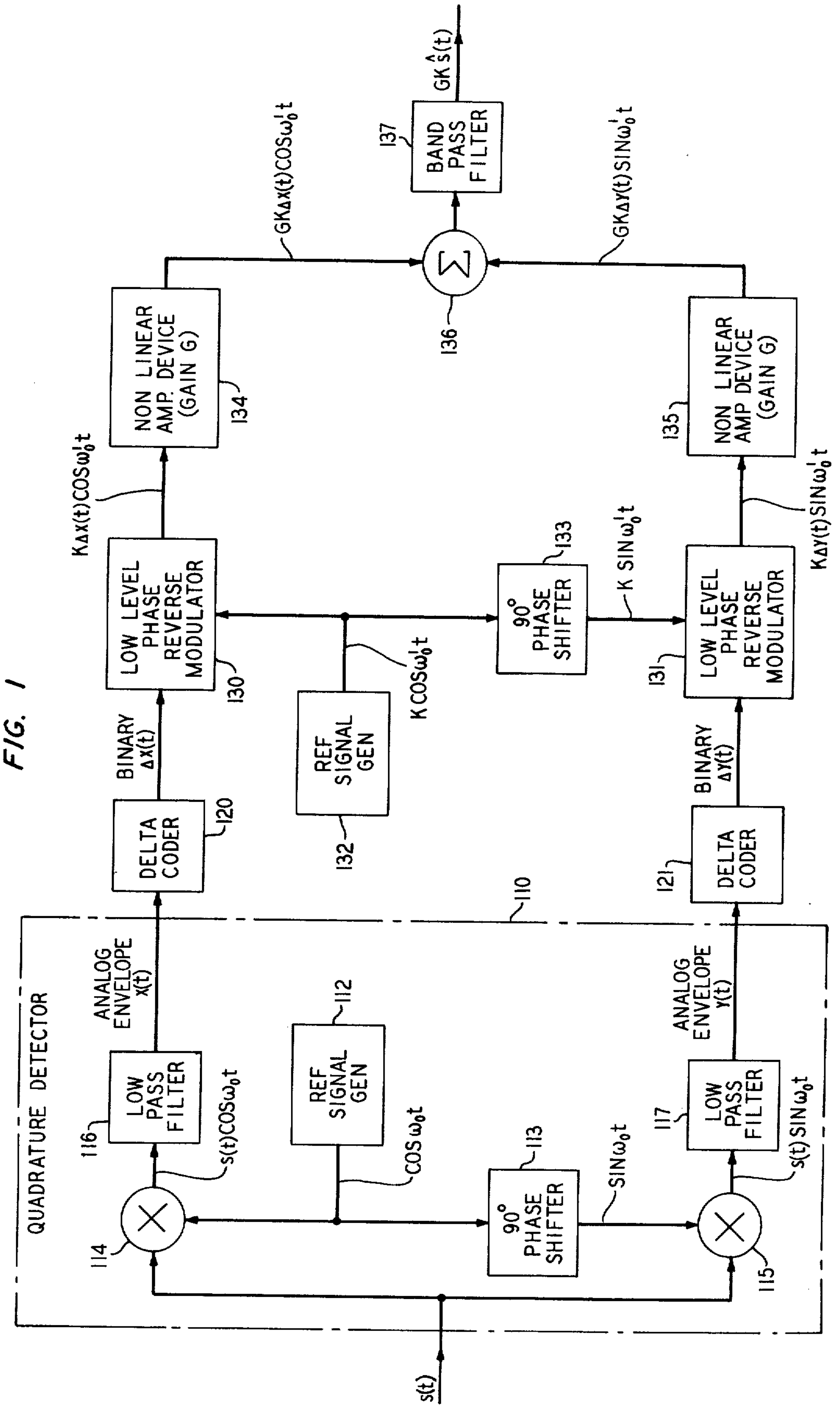
FIG. 1 is a block diagram of a LIST amplifier having low level phase reverse modulation in accordance with the present invention.

The principles and operation of the invention may be best understood by reference to FIG. 1. The input to the LIST amplifier is a general bandpass signal $s(t)$ containing both amplitude and phase fluctuations. As used herein, a bandpass signal has a defined fixed upper and lower frequency cutoff. The bandpass signal $s(t)$ may be expressed in numerous mathematical forms. For convenience, an expression containing the sum of two quadrature components is chosen, thus, $$s(t) = x(t)\cos \omega_o t + y(t)\sin \omega_o t \quad (1)$$

where $s(t)$ has spectral components confined to some band of frequencies of width 2W centered about center frequency, $f_o = \omega_o 2\pi$, where $f_o$ is the reference center frequency for the bandpass signal $s(t)$; $\omega_o$ is the radian reference frequency associated with $f_o$; and $x(t)$ and $y(t)$ are the intelligence containing envelopes of the quadrature signal components $x(t)\cos\omega_o t$ and $y(t)\sin\omega_o t$. The envelopes $x(t)$ and $y(t)$ have spectral components confined to the band of frequencies extending from dc to a frequency W. Thus, 2W is the bandwidth of $s(t)$ and W is the low-pass bandwidth of $x(t)$ and $y(t)$. The functional notation ( ) is used in the conventional sense to indicate a variation of the quantity preceding the parentheses as a function of the quantity within the parentheses. For example, $x(t)$ indicates the variation of amplitude $x$ with time.

This bandpass signal is applied to a quadrature detector 110 which resolves the input $s(t)$ into the two variable amplitude envelopes $x(t)$ and $y(t)$ of the quadrature signal components. The quadrature detector 110 includes a reference signal generator 112, a 90° phase shifter 113, mixers 114 and 115, and identical low-pass filters 116 and 117. The reference signal generator 112 generates a signal which may, for example, be $\cos\omega_o t$ where $\omega_o$ is the above-mentioned radian reference frequency of the input signal $s(t)$. This reference signal is mixed with the input signal $s(t)$ by mixer 114 and the mixer output is low-pass filtered to produce the variable analog envelope $x(t)$ of a quadrature signal component $x(t)\cos\omega_o t$. The reference signal $\cos\omega_o t$ is also shifted 90° by phase shifter 113 to produce $\sin\omega_o t$. $\sin\omega_o t$ is then mixed with the input signal $s(t)$ by mixer 115 and the mixer output is low-pass filtered to produce the variable analog envelope $y(t)$ of the other quadrature signal component $y(t)\sin\omega_o t$. The output of mixer 114 can be expressed mathematically as follows:

$$s(t)\cos\omega_o t = [x(t)\cos\omega_o t + y(t)\sin\omega_o t]\cos\omega_o t \qquad (2)$$

By using well known trigonometric identities the right side of Equation (2) may be shown equal to expression (3) below:

$$\tfrac{1}{2}\,x(t)[\cos(2\,\omega_o t) + \cos(0)] + \tfrac{1}{2}\,y(t)\,[\sin 2\,\omega_o t + \sin(0)]\,. \qquad (3)$$

Low-pass filtering with filter 116 removes the second harmonic terms containing $2\,\omega_o$ to produce $$x(t)\cos(0) = x(t) \qquad (4)$$

where the low-pass filter is assumed to have a gain of 2. Similarly, the low-pass filtering of the output of mixer 115 can be shown to produce $y(t)$. For clarity in explanation we have assumed the amplitude of $\cos\omega_o t$ and $\sin\omega_o t$ to be unity. An amplitude other than unity may be used since it affects only a scaling constant (not shown in the drawings) and does not affect the functioning of the LIST amplifier. The low-pass envelopes $x(t)$ and $y(t)$ each have both positive and negative variations and both are confined to a frequency band from dc to W. Thus, $x(t)$ and $y(t)$ are readily extracted from $s(t)$ by a quadrature detector as illustrated in FIG. 1.

Figure 2:
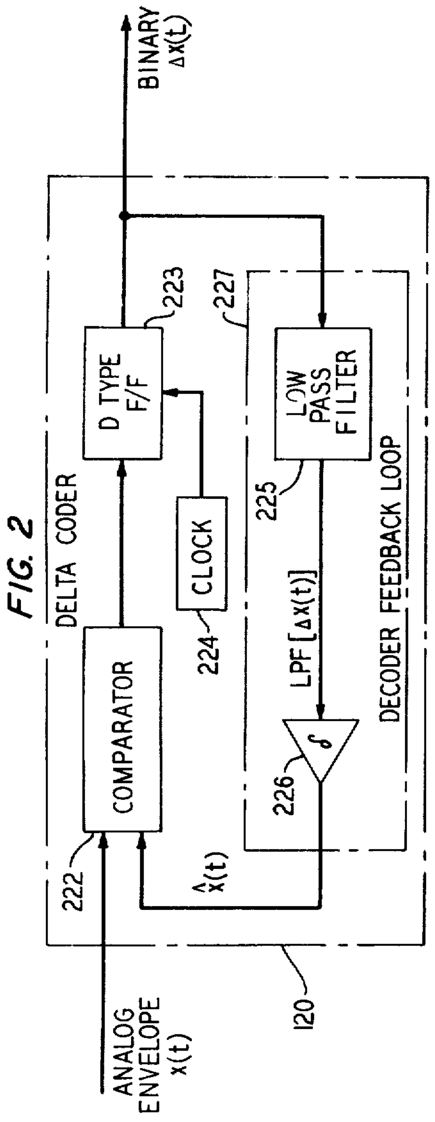
FIG. 2 is a block diagram of the delta coder of the embodiment of FIG. 1 showing both a forward path through the delta coder and a decoder feedback loop which is internal to the delta coder.

The low-pass envelopes $x(t)$ and $y(t)$ are delta coded into ± 1 binary time sequences designated $\Delta x(t)$ and $\Delta y(t)$ by identical delta coders 120 and 121. The symbol Δ as used herein means the ± 1 delta coded binary time sequence or bitstream representing the low-pass signal following the symbol. Thus, $\Delta x(t)$ refers to the delta coded bitstream for $x(t)$ and $\Delta y(t)$ refers to the corresponding bitstream for $y(t)$. It is understood that the choice of binary digits of amplitude 1 is arbitrary and that any amplitude could be chosen. Each delta coder 120 and 121 produces a bitstream, $\Delta x(t)$ or $\Delta y(t)$, respectively, whose weighted time average approximates the envelope of the respective quadrature component, which envelope is applied as an input to the associated delta coder. FIG. 2 shows a detailed block diagram of a delta coder suitable for use in the embodiments of the invention of FIGS. 1 and 3. It is understood, of course, that other types of delta coders could be substituted, and a detailed description of the operation of a delta coder, a well-known device, may be found in an article entitled "Delta Modulation" by H. R. Schindler in the IEEE Spectrum, October, 1970, pages 69–78.

The following description of FIG. 2, while describing the process of $x(t)$ in delta coder 120 is identically applicable to the process of $y(t)$ in delta coder 121 which latter processing is not shown in the drawings. The analog envelope input is applied to a comparator 222 and the output of the comparator is applied to a D-type flip-flop 223 controlled by a clock 224. The output of the D-type flip-flop is the delta coded bitstream $\Delta x(t)$. This bitstream is applied to a low-pass filter 225 and the output of the low-pass filter designated LPF $[\Delta x(t)]$ representing a low-pass filtered $\Delta x(t)$, is applied to a step size controlling amplifier 226 of gain δ. The output $\hat{x}(t)$ of the step size controlling amplifier 226 is applied as an input to the comparator 222. The low-pass filter and the step size controlling amplifier together comprise a decoder feedback loop 227 of the delta coder 120. In general, delta coding is the process of converting an input analog signal to a digital signal whose weighted time average as produced by a low-pass filter is an approximation of the input analog signal. Decoding of a delta coded bitstream is the process of weighted time averaging the bitstream to recover a replica of the analog signal. Thus, the decoder feedback loop 227 of the delta coder reconstructs (decodes) the analog waveform designated $x(t)$ from the binary input $\Delta x(t)$ to the decoder 227. The waveform $x(t)$ is a replica of the envelope $x(t)$. LPF $[\Delta x(t)]$ is a low-pass filtered version of $\Delta x(t)$ and has the important characteristic that it is a decoded replica of the input waveform $x(t)$, differing from $\hat{x}(t)$ only by a gain constant δ. The amplified output $\hat{x}(t)$ is then the decoded approximation of the input waveform $x(t)$ which output $\hat{x}(t)$ is compared to $x(t)$ by the comparator 222 to determine whether the next bit in the bitstream will be a +1 or a −1 such that the decoded replica $\hat{x}(t)$ continues to approximate the input as closely as possible within the capability of the chosen step size and clock rate.

As shown in FIG. 1, the delta coded bitstream outputs $\Delta x(t)$ and $\Delta y(t)$, of the respective delta coders 120 and 121 are applied respectively to phase reverse modulators 130 and 131 which phase reverse (phase shift key) modulate two modulation reference signals, $K\cos\omega_o't$ and $K\sin\omega_o't$ generated by signal generator 132, the latter being phase shifted by 90° phase shifter 133. The result of the modulation process is the formation of two constant envelope signals $K\Delta x(t)\cos\omega_o't$ and $K\Delta y(t)\sin\omega_o't$. In these expressions K is the amplitude and $\omega_o'$ is the frequency in radians of the reference signal. In the most general case as shown in FIG. 1, the modulation reference frequency $\omega_o'$ in radians used in the phase reverse modulation process is not equal to the reference radian frequency $\omega_o$ used in quadrature detector 110. However, it is understood that $\omega_o'$ may equal $\omega_o$ if the LIST output $GK\hat{s}(t)$ is to be at the same frequency as the input $s(t)$. If, as shown in FIG. 1, $\omega_o'$ is not equal to $\omega_o$, then frequency translation from $\omega_o$ to $\omega_o'$ as well as amplification occurs in the overall LIST amplifier.

The constant envelope signals $K\Delta x(t)\cos\omega_o't$ and $K\Delta y(t)\sin\omega_o't$ are then amplified by gain matched broadband nonlinear amplifying devices 134 and 135 each having gain G to produce two signals, $GK\Delta x(t)\cos\omega_o't$ and $GK\Delta y(t)\sin\omega_o't$ whose amplitude is greater than the maximum amplitude of the original input signal. The latter are summed by passive linear combiner 136 which may be a well known hybrid combiner such as a magic tee with one port appropriately terminated. The sum is then bandpass filtered by filter 137 to produce a linearly amplified replica $GK\hat{s}(t)$ of the original input signal $s(t)$.

The nonlinear amplifying devices 134 and 135 may be nonlinear amplifiers or constant amplitude phase-locked oscillators and may contain devices such as transistors, IMPATT diodes, GUNN diodes, magnetrons, klystrons, traveling wave tubes and other semiconductor or vacuum tube amplifying devices. The gain of the nonlinear amplifying devices must be matched to insure that the amplitudes of the signals $GK\Delta x(t)\cos\omega_o't$ and $GK\Delta y(t)\sin\omega_o't$ are equal. In addition, since combiner 136 and bandpass filter 137 are linear devices, their order in the circuit may be reversed and the signals $GK\Delta x(t)\cos\omega_o't$ and $GK\Delta y(t)\sin\omega_o't$ could be each first separately bandpass filtered and the filtered resultants then combined.

As a general principle of communications theory, the phase reverse modulation process (which is also known as balanced mixing) translates the frequency spectrum of $\Delta x(t)$ and $\Delta y(t)$ in frequency from dc to $\omega_o'$; i.e., from a low-pass spectrum to a bandpass spectrum. As noted above, the low-pass filtered versions of $\Delta x(t)$ and $\Delta y(t)$, designated LPF $[\Delta x(t)]$ and LPF $[\Delta y(t)]$, are proportional to the reconstructed analog (decoded) waveforms $\hat{x}(t)$ and $\hat{y}(t)$ of the respective envelope inputs to the delta coders 120 and 121 respectively. The filtering of bandpass waveforms centered at a radian frequency $\omega_o'$ with symmetrical bandpass filters centered at $\omega_o'$ is equivalent to filtering the low-pass envelopes $x(t)$ and $y(t)$ of the bandpass waveforms with equivalent low-pass filters, provided that the bandpass filter transfer function is the mathematical bandpass equivalent of the low-pass filter transfer function. Derivation and further explanation of this equivalence may be found in Papoulis, "The Fourier Integral and Its Applications", McGraw Hill, New York, 1962, Chapter 7.

From the above principles it is evident that bandpass filtering $GK\Delta x(t)\cos\omega_o't$ and $GK\Delta y(t)\sin\omega_o't$ with a symmetrical bandpass filter 137 equivalent to the low-pass filter 225 of the decoder feedback loop 227 of the delta coder of FIG. 2 will yield reconstructed amplified versions of the original quadrature components of the input waveform $s(t)$. That is, $$BPF\ [GK\Delta x(t)\cos\omega_o't] = GK\hat{x}(t)\cos\omega_o't \tag{5}$$

and $$BPF\ [GK\Delta y(t)\sin\omega_o't] = GK\hat{y}(t)\sin\omega_o't \tag{6}$$

where $BPF$ [ ] means the process of bandpass filtering the bracketed quantity. $GK\hat{x}(t)$ is the same replica of the quadrature signal component envelope $x(t)$ except for a gain constant, as the replica $\hat{x}(t)$ at the decoder 227 output of the delta coder 220 provided that the bandpass filter 137 filtering process BPF [ ] is the bandpass equivalent of the decoder low-pass filter 225 filtering process LPF [ ]. The output of the bandpass filter 137 which output is the sum of $GK\Delta x(t)\cos\omega_o't$ and $GK\Delta y(t)\sin\omega_o't$ may be expressed mathematically by $$BPF[GK\Delta x(t)\cos\omega_o't + GK\Delta y(t)\sin\omega_o't] = GK(BPF[\Delta x(t)\cos\omega_o't] + BPF[\Delta y(t)\sin\omega_o't]) = GK(\hat{x}(t)\cos\omega_o't + \hat{y}(t)\sin\omega_o't) = GK\hat{s}(t). \tag{7}$$

Thus, in this LIST technique the bandpass filter 137 acts as a delta decoder operating on the delta coded envelopes $\Delta x(t)$ and $\Delta y(t)$ of the summed quadrature signal components $GK\Delta x(t)\cos\omega_o't$ and $GK\Delta y(t)\sin\omega_o't$ because of the mathematical equivalence between the process of bandpass filtering of envelopes $\Delta x(t)$ and $\Delta y(t)$ of the bandpass signals and the process of low-pass filtering of the low-pass envelopes $\Delta x(t)$ and $\Delta y(t)$ themselves.

Figure 3:
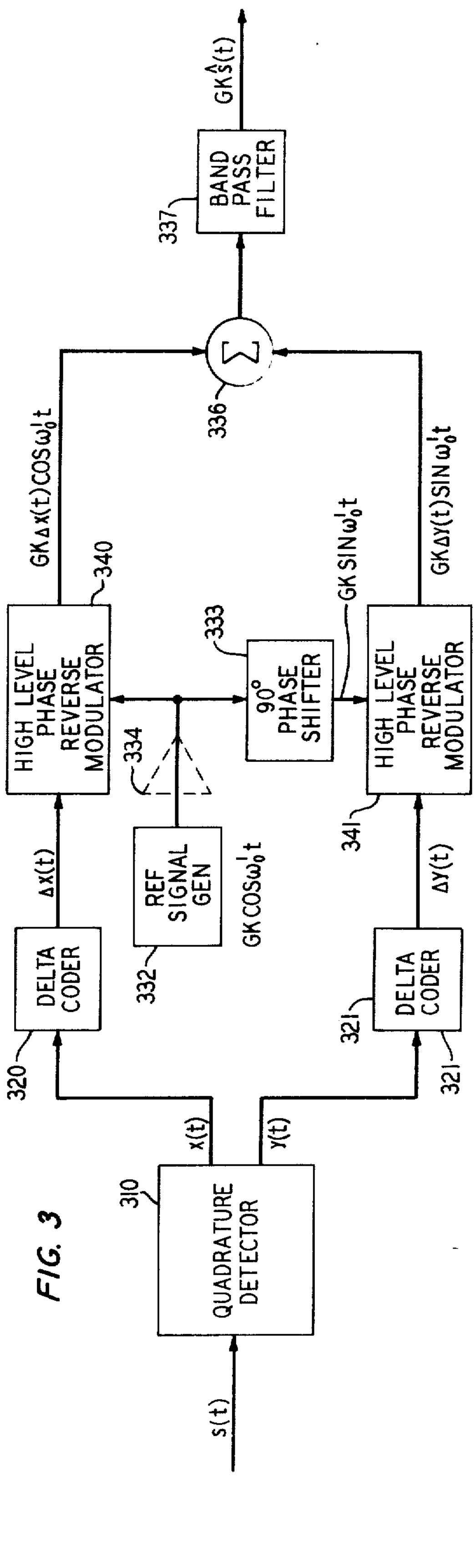
FIG. 3 is a block diagram of an alternative embodiment of the invention having high level phase reverse modulation.

An alternative configuration for a quadrature component LIST is illustrated in FIG. 3. (In FIGS. 1, 3 and 4 elements with identical last two digits perform identical functions.) In the alternative configuration of FIG. 3, the modulation reference signals GK cos $\omega_o't$ and GK sin $\omega_o't$, are high power signals with amplitude GK greater than the maximum amplitude of the original input signal. This requires higher power handling capability and thus probably lower loss in phase reverse modulators 340 and 341 than required in the embodiment of FIG. 1. The requirement of the embodiment of FIG. 1 for gain matched broadband amplifiers is overcome because all amplification is done on the single frequency reference signal generated by generator 332. An amplifier 334 is sketched in phantom to indicate that the modulation reference signals are high level. Of course, the output amplitudes of the high power phase reverse modulators must be equal.

Figure 4:
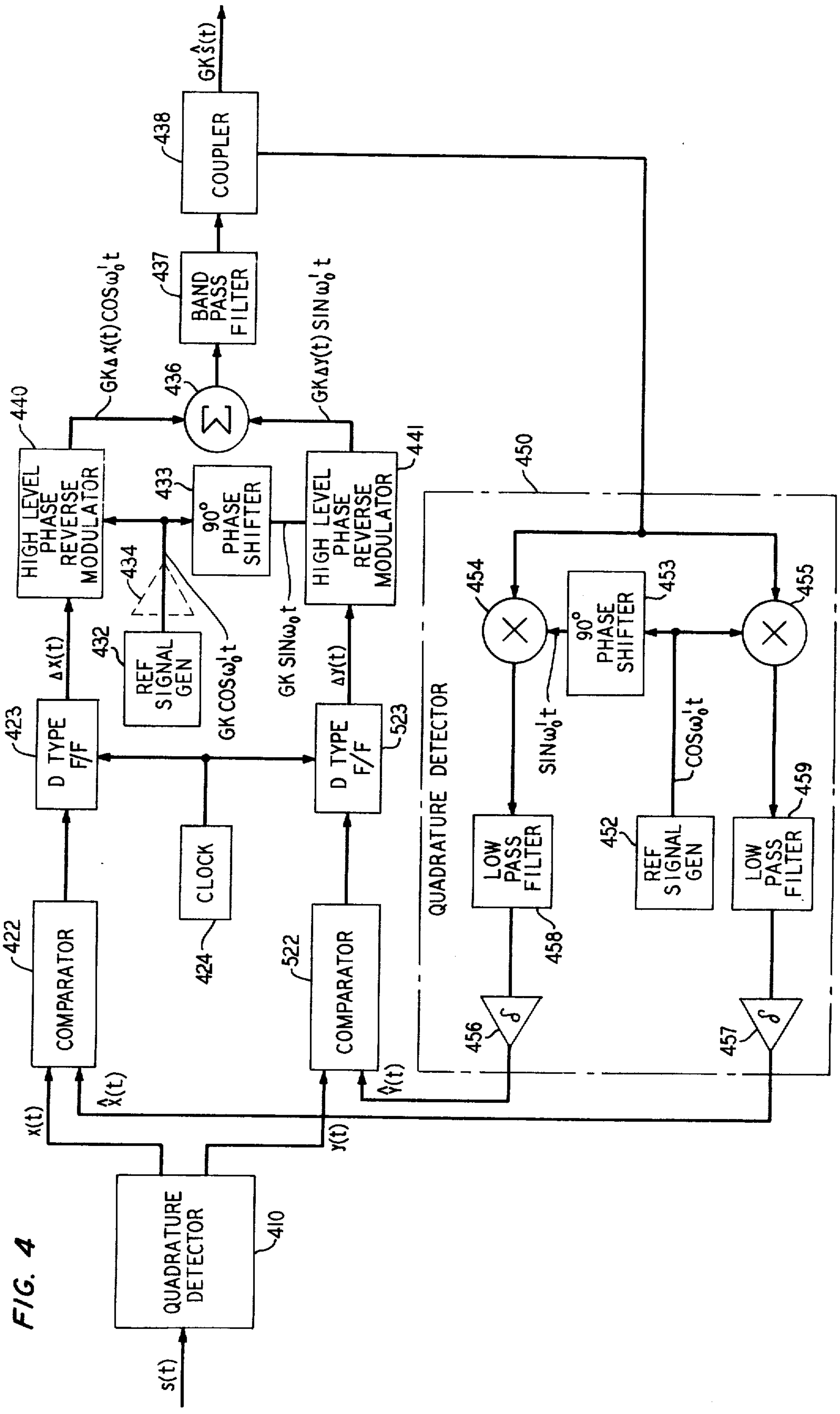
FIG. 4 is a block diagram of an alternative embodiment of the invention having external decoder feedback.

FIG. 4 shows another quadrature component LIST with external decoder feedback instead of a delta coder with associated internal decoder feedback. High level phase reverse modulators 440 and 441 are illustrated in FIG. 4 but it is understood, of course, that low level phase reverse modulators and amplifiers may be used instead. In this external feedback embodiment, an original input signal is applied to a quadrature detector 410. The two resulting analog envelopes $x(t)$ and $y(t)$ of quadrature components are applied to separate comparators 422 and 522. The outputs of each comparator are applied to D-type flip-flops 423 and 523, respectively. The coded binary outputs $\Delta x(t)$ and $\Delta y(t)$ of the flip-flops are used in high level phase reverse modulators 440 and 441 to modulate reference signals GK cos $\omega_o't$ and GK sin $\omega_o't$ of equal amplitude generated by a reference signal generator 432, the latter shifted by 90 degree phase shifter 433. The outputs of the phase reverse modulators are then summed by combiner 436, bandpass filtered by filter 437 and applied to a coupler 438. The function of the coupler is to remove a small (low power) sample of the reconstructed replica $GK\hat{s}(t)$ of the input signal $s(t)$ from the filter 437. The output from the coupler is applied to a quadrature detector 450 which comprises a reference signal generator 452, a 90° phase shifter 453, two multiplier mixers 454 and 455, identical low-pass filters 458 and 459, and step size controlling amplifiers 456 and 457. The reconstructed analog envelopes $\hat{x}(t)$ and $\hat{y}(t)$ of quadrature signal components detected by detector 450 are fed back respectively to the same comparators 422 and 522 to which analog envelopes $x(t)$ and $y(t)$ are applied. This scheme may be described as external coder feedback because the feedback loop of FIG. 2 containing low-pass decoder 227 internal to coder 220 has been replaced by the bandpass equivalent decoder comprising bandpass filter 437, coupler 438 and quadrature detector 450. This external feedback loop serves the same function in this embodiment as the internal decoder feedback loop 227 of FIG. 2 serves in the delta coders of embodiments of FIGS. 1 and 3. The low-pass filters 458 and 459 shown in the quadrature detector 450 in FIG. 4, need only reject both the reference frequency $\omega_o'$ and sum frequency $2\omega_o'$ from the mixer outputs so that the bandwidths of filters 458 and 459 can be made large enough to insure that they do not produce additional filtering over and above that provided by filter 437 and thus do not enter into the decoding process. That is, the cutoff frequency of the low-pass filters 458 and 459 is much greater than one-half the bandwidth of the output bandpass filter 437. This embodiment of FIG. 4 should result in lower distortion than the one in FIG. 3 because the incremental adjustments made by the comparators 422 and 522 are in response to the envelopes of the quadrature components of the actual reconstructed LIST output signal $GK\hat{s}(t)$ and not to a reconstruction from coder 320 and 321 outputs alone. Incremental adjustments will be made by the comparators to correct for imperfections in the phase reverse modulators.

In all cases, it is to be understood that the above described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A device for amplifying a high frequency bandpass analog input signal having both amplitude and phase variations and having a given maximum amplitude comprising:

quadrature detector means for producing from the input signal a pair of variable amplitude intelligence containing envelopes each said envelope being derived from different ones of the quadrature signal components of the input signal;

means for producing from each variable amplitude envelope a bitstream approximation whose weighted time average is a replica of the respective envelope;

means for generating two quadrature reference signals of equal amplitude;

means for phase reverse modulating the two quadrature reference signals respectively with ones of the two bitstream approximations to produce two constant envelope signals of amplitude greater than the maximum amplitude of the input signal;

means for combining the two constant envelope signals to produce a linearly amplified replica of the original analog input signal.

2. A device as described in claim 1 wherein said means for producing the bitstream approximation of each variable envelope is a pair of delta coders.

3. A device as described in claim 2 wherein each delta coder has a decoder feedback loop containing a low-pass filter.

4. A device as described in claim 3 wherein said means for combining includes means for bandpass filtering the two constant envelope signals, said means for bandpass filtering having characteristics equivalent to those of the low-pass filter of the decoder feedback loop of the delta coder.

5. A device as described in claim 1 wherein said means for generating produces two quadrature reference signals each having a maximum amplitude greater than the maximum amplitude of the original input signal, and said means for modulating includes a pair of high level phase reverse modulators.

6. A device as described in claim 1 wherein said means for modulating includes a pair of low level phase reverse modulators which produce two low level constant envelope signals, and an individual amplifier for separately amplifying each of the low level signals.

7. A device as described in claim 1 wherein said means for combining includes a summing device for combining the two constant envelope signals and a bandpass filter for filtering the combination.

8. A device as described in claim 1 wherein said means for combining includes at least one bandpass filter for filtering each of the two constant envelope signals and a summing device for combining the filtered signals.

9. A device as described in claim 1 wherein said means for producing a bitstream approximation includes means for comparing the envelopes of the quadrature components with a signal derived from the linearly amplified replica produced by the combining means.

10. A device for amplifying a high frequency bandpass analog input signal having both amplitude and phase variations and having a given maximum amplitude comprising:

quadrature detector means for producing from the input signal a pair of variable amplitude intelligence containing envelopes each said envelope being derived from different ones of the quadrature signal components of the input signal;

delta coder means for producing from each variable amplitude envelope a bitstream approximation whose weighted time average is a replica of the respective envelope;

means for generating two quadrature reference signals of equal amplitude;

means for phase reverse modulating the two quadrature reference signals respectively with ones of the two bitstream approximations to produce two constant envelope signals;

means for amplifying the two constant envelope signals;

means for combining the two amplified constant envelope signals; and means for bandpass filtering the combination to produce a linearly amplified replica of the original analog input signal.

* * * * *